United States Patent [19]
Benson

[11] Patent Number: 5,978,469
[45] Date of Patent: Nov. 2, 1999

[54] APPARATUS FOR TELEPHONE EXTENSION CONTROL

[75] Inventor: Harvey J. Benson, Denver, Colo.

[73] Assignees: U S West, Inc., Denver; MediaOne Group, Inc., Englewood, both of Colo.

[21] Appl. No.: 08/785,113

[22] Filed: Jan. 21, 1997

[51] Int. Cl.$^6$ .................................................. H04M 3/00
[52] U.S. Cl. ......................... 379/377; 379/156; 379/161; 379/373
[58] Field of Search .................................. 379/377, 168, 379/171, 179, 181, 184, 161, 165, 373, 201, 211, 156

[56] References Cited

U.S. PATENT DOCUMENTS

| | | | |
|---|---|---|---|
| 4,081,615 | 3/1978 | Hoehn | 179/18 |
| 4,218,590 | 8/1980 | Rasmussen et al. | 179/99 |
| 4,266,103 | 5/1981 | White | 179/99 |
| 4,578,540 | 3/1986 | Borg et al. | 179/2 |
| 4,640,988 | 2/1987 | Robinton | 379/90 |
| 4,674,115 | 6/1987 | Kaleita et al. | 379/201 |
| 4,805,210 | 2/1989 | Griffith, Jr. | 379/195 |
| 4,809,317 | 2/1989 | Howe et al. | 379/98 |
| 4,825,465 | 4/1989 | Ryan | 379/399 |
| 4,899,372 | 2/1990 | Wahi et al. | 379/184 |
| 5,003,581 | 3/1991 | Pittard | 379/93 |
| 5,022,068 | 6/1991 | Fujisaki et al. | 379/62 |
| 5,040,209 | 8/1991 | Greenberg et al. | 379/373 |
| 5,048,076 | 9/1991 | Maurer et al. | 379/94 |
| 5,090,052 | 2/1992 | Nakajima et al. | 379/160 |
| 5,206,901 | 4/1993 | Harlow et al. | 379/211 |
| 5,265,154 | 11/1993 | Schotz | 379/102 |
| 5,347,574 | 9/1994 | Morganstein | 379/88.21 |
| 5,408,528 | 4/1995 | Carlson et al. | 379/211 |
| 5,444,772 | 8/1995 | Coker | 379/161 |
| 5,454,033 | 9/1995 | Hahn et al. | 379/198 |

FOREIGN PATENT DOCUMENTS

WO 86/06570  3/1986  WIPO.

*Primary Examiner*—Forester W. Isen
*Assistant Examiner*—Jacques M. Saint-Surin
*Attorney, Agent, or Firm*—Holme, Roberts, Owen

[57] ABSTRACT

The present invention is directed to a control system which interfaces a plurality of telephones, referred to as extensions, to a central office telephone line. The control system includes a ring detector, a ring generator, a controller and a telephone extension bus. In accordance with one embodiment of the present invention, the control system is programmable to: (i) control the ringing function of a plurality of extensions when an incoming call is received; (ii) control the staging of the ringing function of a plurality of extensions when an incoming call is received; (iii) control the use of one or more of a plurality of extensions to initiate an outgoing call; (iv) control the use of one or more of a plurality of extensions when another extension is in-use, i.e. presently being used to engage in an ongoing telephone call; (v) control the use of one or more of a plurality of extensions when another extension is being used for a data call, i.e., a data transmission or communication between machines including, for example, facsimile machines and computers; and (vi) control access to a central office telephone line by one or more extensions when another extension is in-use.

19 Claims, 6 Drawing Sheets

APPARATUS FOR TELEPHONE EXTENSION CONTROL

FIELD OF THE INVENTION

The invention relates generally to telephone extension controller apparatuses and is particularly apt for use in systems which control telephones located within a residence.

BACKGROUND OF THE INVENTION

Generally, residential telephone service is provided via a central office telephone line which electrically connects a residence to a central office switch. This connection, which is usually made to the residence at a location known as the protector block, enables a residential telephone to be used to communicate with others via the central office switch. Typically, multiple telephones, referred to as extensions, are located throughout the residence and are all individually electrically connected to the protector block (i.e., a "home run" connection) or are connected to each other (i.e., "parallel" connection). Thus, any one of a plurality of extensions located in, for example, the kitchen, living room, family room, study, bedrooms, basement, garage, or workshop, can be used to answer incoming calls from others or initiate outgoing calls to others, via the central office telephone line. Multiple extensions are desirable because they provide easy access to answer or initiate telephones calls, regardless of a person's location in the residence.

Electrically connecting multiple extensions to a central office telephone line causes all such extensions to ring to indicate the presence of an incoming call. In this regard, an extension's ringer is driven by a nominal voltage, usually 86 volts rms at 20 hertz, superimposed temporarily on the central office telephone line by the central office switch to indicate the presence of an incoming call. It is sometimes undesirable to ring all extensions in a residence when an incoming call is received, including for example, ringing an extension in a child's bedroom when the child is studying; or ringing a extension in a bedroom when a family member is asleep. Further, it is sometimes undesirable to ring all extensions during certain times of the day when persons within the residence tend to congregate in particular areas of the residence, including for example, ringing bedroom, study, workshop extensions, during times when family members are likely to be eating dinner in the kitchen; or ringing bedroom, workshop, kitchen extensions during times when the only family member present is likely to be in the study.

Electrically connecting multiple extensions to a central office telephone line also allows all such extensions to be used to initiate an outgoing call, via the central office telephone line. In this regard, any extension can be used to initiate an outgoing call by taking the extension's hand set off-hook to obtain central office dial tone and dialing a number sequence corresponding to a called party's telephone number. It is sometimes undesirable to allow multiple access to the central office telephone line by all the extensions, including for example, allowing an extension in a child's bedroom to be used to initiate an outgoing call during times when the child should be studying.

Electrically connecting multiple extensions to a central office telephone line also allows such extensions to access the central office telephone line when another extension is in-use, i.e., presently being used to engage in an ongoing call. Consequently, the possibility arises that a second user may disrupt a first user's ongoing call by attempting to initiate an outgoing call at another extension. For example, a second family member may disrupt a first family member's ongoing call by taking an extension's hand set off-hook and attempting to dial a telephone number, without realizing that the first family member is already engaged in a call.

Typically, residential telephone service is used for voice calls. However, residential telephone service is increasingly being used for data calls, i.e., data transmissions and communications between machines including, for example, facsimile machines and computers. In this regard, it is becoming more common for a central office telephone line to be electrically connected to, for example, a computer for the purpose of allowing a user of the computer to navigate the Internet, send or receive e-mail messages, or send or receive facsimiles. Providing multiple extensions within a residence raises the possibility that a data call at one extension may be appreciably disrupted by an attempt to initiate an outgoing call at another extension. For example, a second family member disrupting, e.g. disconnecting, a first family member's facsimile transmission by taking an extension's hand set off-hook and dialing a telephone number, without realizing that the first family member is engaged in a data call.

SUMMARY

It is an objective of the present invention to provide an telephone control apparatus which controls the ringing function and use of multiple telephones, and which is particularly apt for controlling multiple telephones located within a residence.

It is an objective of the present invention to provide a telephone control apparatus which is easily interfaces a conventional telecommunications system with multiple telephones, and which is particularly apt for easy installation at a residence having telephone service and multiple extensions.

The present invention is directed to a control system which: (i) controls the ringing function of a plurality of telephones, referred to as extensions when an incoming call is received; (ii) controls the staging of the ringing function of a plurality of extensions when an incoming call is received; (iii) controls the use of one or more of a plurality of extensions to initiate an outgoing call; (iv) controls the use of one or more of a plurality of extensions when another extension is in-use, i.e. presently being used to engage in an ongoing call; (v) controls the use of one or more of a plurality of extensions when another extension is being used for a data call, i.e., data transmissions and communications between machines including, for example, facsimile machines and computers; (vi) controls access to the central office telephone line by one or more extensions when another extension is in-use; and (vii) is programmable.

In accordance with one embodiment, the control system of the present invention interfaces a conventional telecommunications system with multiple telephones located at various locations within a residence. The control system should be located at a point in the residence where a central office telephone line and telephone wiring interior to the residence are easily accessible. Most advantageously, the control system is positioned near the residence's protector block. The control system provides a "line side" offering connection to a central office telephone line and a "distribution" side offering connection to multiple telephone lines interior to the residence.

In accordance with one aspect of the invention, the control system controls the ringing function of one or more of a plurality of extensions, when an incoming call is received. In this regard, the control system selectively rings one or more extensions when an incoming call is received. For example, the control system can be directed to ring a primary extension, e.g. ringing the kitchen extension. Additionally, the control system selectively does not ring one or more extensions when an incoming call is received. For example, the control system can be directed to not ring an extension in a child's bedroom when the child is studying; or not ring an extension in a bedroom while a family member is sleeping. Preferably, the control system rings extensions in accordance with the time of day. For example, the control system can be directed to ring the kitchen extension during times when family members are likely to be eating breakfast, lunch or dinner.

In accordance with another aspect of the invention, the control system controls the staging of the ringing function of a plurality of extensions, when an incoming call is received. In this regard, the control system selectively rings one or more extensions when an incoming call is received. If the incoming call is not answered after a predetermined number of rings or time, the control system rings other extensions. For example, if the control system rings a kitchen extension during dinner time and the incoming call is not answered after five rings, the control system can be directed to discontinue ringing the kitchen extension and ring other extensions located elsewhere in a residence, e.g. the living room extension.

In accordance with another aspect of the invention, the control system controls the use of one or more of a plurality of extensions to initiate an outgoing call. In this regard, the control system selectively disables one or more extensions from being used to initiate an outgoing call. For example, the control system can be directed to disconnect an extension in a child's bedroom from the central office telephone line during times when the child should be studying. Consequently, the extension in the child's bedroom is not usable to answer an incoming call or initiate an outgoing call.

In accordance with another aspect of the invention, the control system controls the use of one or more of a plurality of extensions when another extension is in-use. In this regard, the control system selectively disables one or more extensions from being used to initiate an outgoing call when another extension is in-use. For example, the control system can be directed to disconnect none, one, or more extensions not in-use from accessing the central office telephone line when another extension is in use. Consequently, a first family member's ongoing call will continue uninterrupted when a second family member takes an extension's hand set off-hook. Preferably, the control system is capable of providing a secured line, i.e. disabling all other extensions when a specific extension is in-use. For example, the control system can be directed to disable all other extensions when a master bedroom extension is in-use, thereby providing privacy to an ongoing call on the master bedroom extension.

In accordance with another aspect of the invention, the control system controls the use of a plurality of extensions when another extension is being used for a data call. In this regard, the control system disables all extensions from being used to initiate an outgoing call when another extension is being used for a data call. For example, the control system can be directed to disconnect all extensions from accessing the central office telephone line when another extension is being used to access the Internet. Preferably, the control system is capable of providing a secured line for a specific extension which is used for data calls. For example, the control system can be directed to disable all other extensions when a study extension, where data calls are likely to occur, is in-use. Preferably, the control system detects whether a specific extension is being used for a data call and automatically disables all other extensions from accessing the central office telephone line. For example, the control system can include hardware to monitor whether the central office telephone line is being used for a data call. If the hardware detects an ongoing data call, the control system can be directed to disable all extensions, except the extension being used for the data call.

In accordance with another aspect of the invention, the control system controls access to the central office telephone line by one or more extensions when another extension is in-use. In this regard, the control system selectively connects one or more extensions to the central office telephone line when an ongoing call is occurring on another extension. For example, the control system can be directed to allow a parent to use a kitchen extension to connect to a child's ongoing call occurring on a bedroom extension, so that the parent can tell the child that dinner is ready. The control system can also selectively give any one extension priority to the central office telephone line when another extension is in-use. For example, in cases of emergency, e.g. a 911 call, the control system can be directed to automatically disconnect the ongoing call and give an extension immediate access to the central office telephone line. Preferably, the control system automatically dials 911 to gain immediate access to emergency services.

In accordance with another aspect of the invention, the control system is programmable. In this regard, the control system's control is directed in accordance with a user's instruction. Preferably, the control system's control is programmable to occur in accordance with the time of day. For example, the control system can be programmed to ring all extensions simultaneously during times when family members may be located throughout a residence, and selectively extensions during times when certain family members should not be disturbed. Preferably, the control system is programmable, for example, by the use of toggle switches, dual tone multiple frequency band receivers, home computers, infrared remote control devices, screen type telephone devices, or voice recognition receivers.

DETAILED DESCRIPTION

Figure 1:
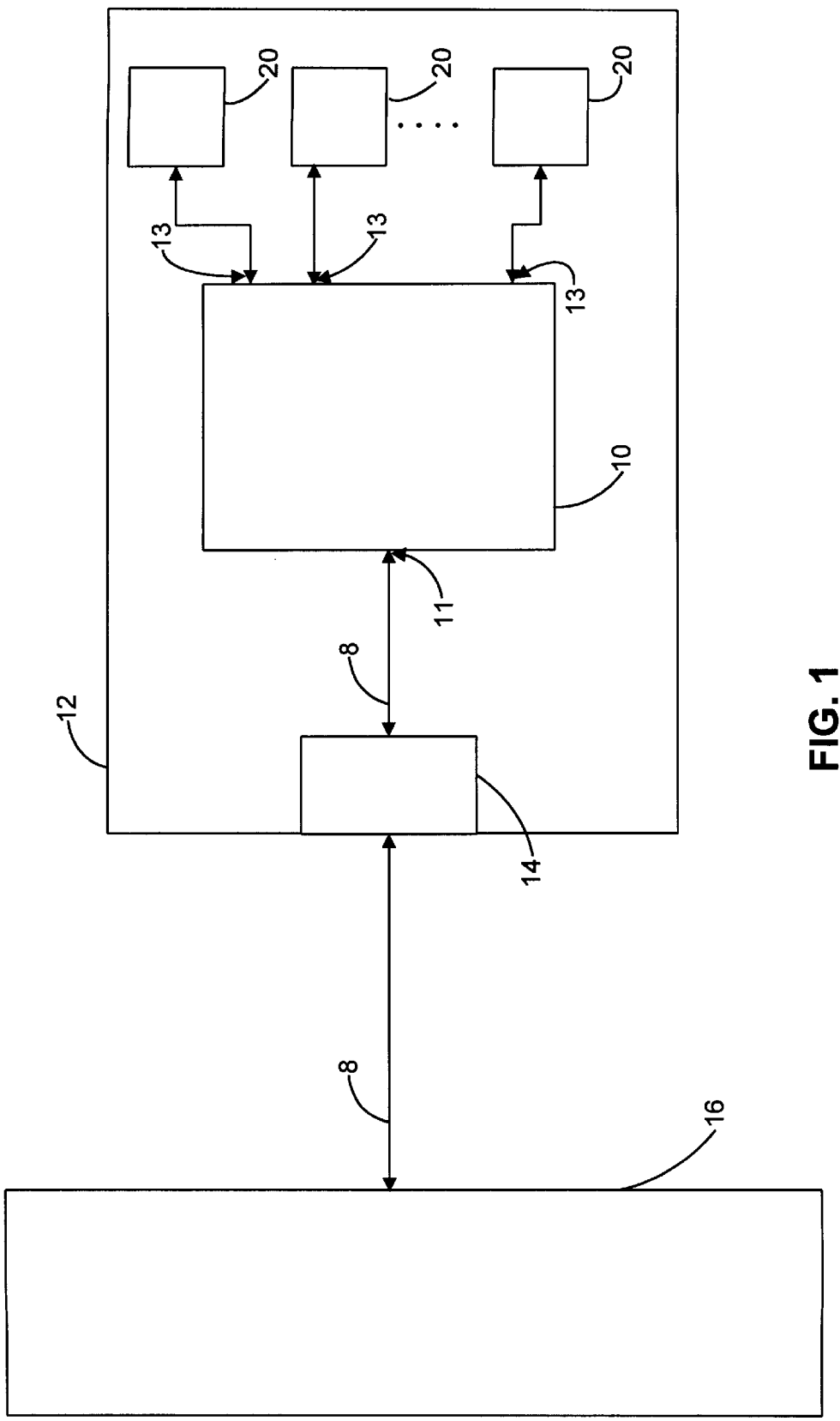
FIG. 1 illustrates a telephone system utilizing a control system according to one embodiment of the present invention.

FIG. 1 illustrates a conventional telecommunications system utilizing a control system 10 according to one embodiment of the present invention. As shown in FIG. 1, a central office telephone line 8 interconnects a central office 16 to a residence 12. Preferably, the control system 10 is located at a point in the residence 12 where the central office telephone line 8 is easily accessible. More preferably, the control system 10 is positioned near a protector block 14, which is where the central office telephone line 8 is typically electrically connected to the residence 12. The control system 10 interfaces a plurality of telephones, referred to as extensions 20, located at various points in the residence 12 to the central office telephone line 8. The extensions 20 are shown in shown in FIG. 1 utilizing a home run connection. Preferably, the control system 10 provides a line side offering connection 11 to the central office telephone line 8 and a distribution side offering connections 13 to the extensions 20.

Figure 2:
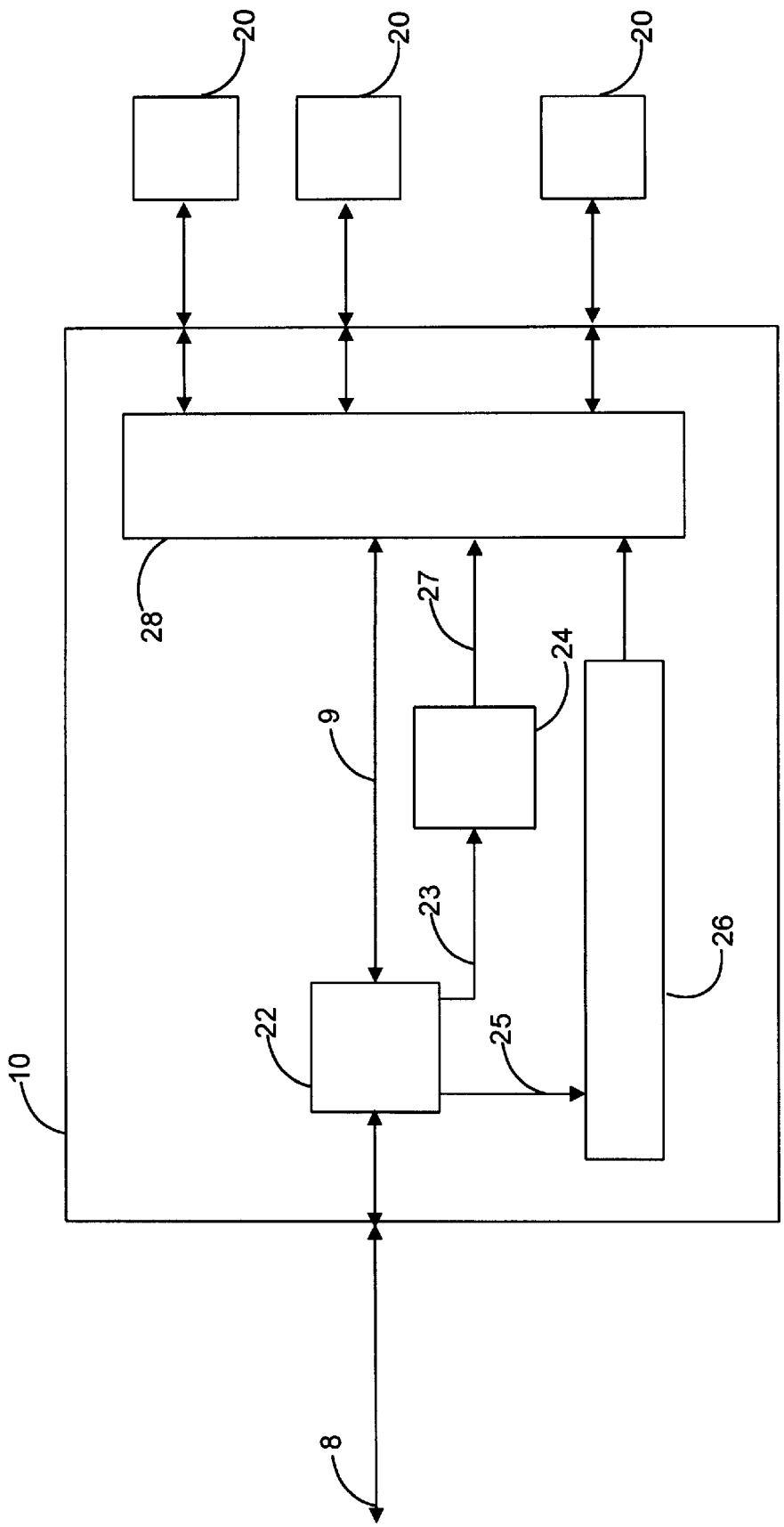
FIG. 2 shows the components of the control system according to one embodiment of the present invention.

As shown in FIG. 2, the control system 10 includes a ring detector 22, a ring generator 24, a controller 26 and a telephone extension bus 28. In accordance with one aspect of the invention, the control system 10 controls the ringing function of the extensions 20 when an incoming call is received. In this regard, the ring detector 22 monitors the telephone line 8 for the presence of a ring signal, typically an 86 volts rms 20 hertz signal superimposed temporarily on the central office telephone line 8 by the central office 16 to indicate the presence of an incoming call. The ring detector 22 is an off-the-shelf device known to those skilled in the art. Upon detecting the presence of the ring signal, the ring detector 22 removes the presence of the ring signal and provides the central office telephone line 8, absent the ring signal, on telephone line 9. Additionally, upon detecting the ring signal, the ring detector 22 indicates the presence of an incoming call to the ring generator 24 and the controller 26 on lines 23, 25 respectively.

Upon receiving an indication of an incoming call from the ring detector 22, the ring generator 24 generates a ring signal, preferably equivalent to the central office ring signal, and provides the generated ring signal to the telephone extension bus 28 on line 27. The ring generator 24 is an off-the-shelf device known to those skilled in the art. Upon receiving an indication of an incoming call from the ring detector 22, the controller 26 directs the telephone extension bus 28 to selectively provide the ring signal generated by the ring generator 24 to none, one or more of the plurality of extensions 20.

Figure 3:
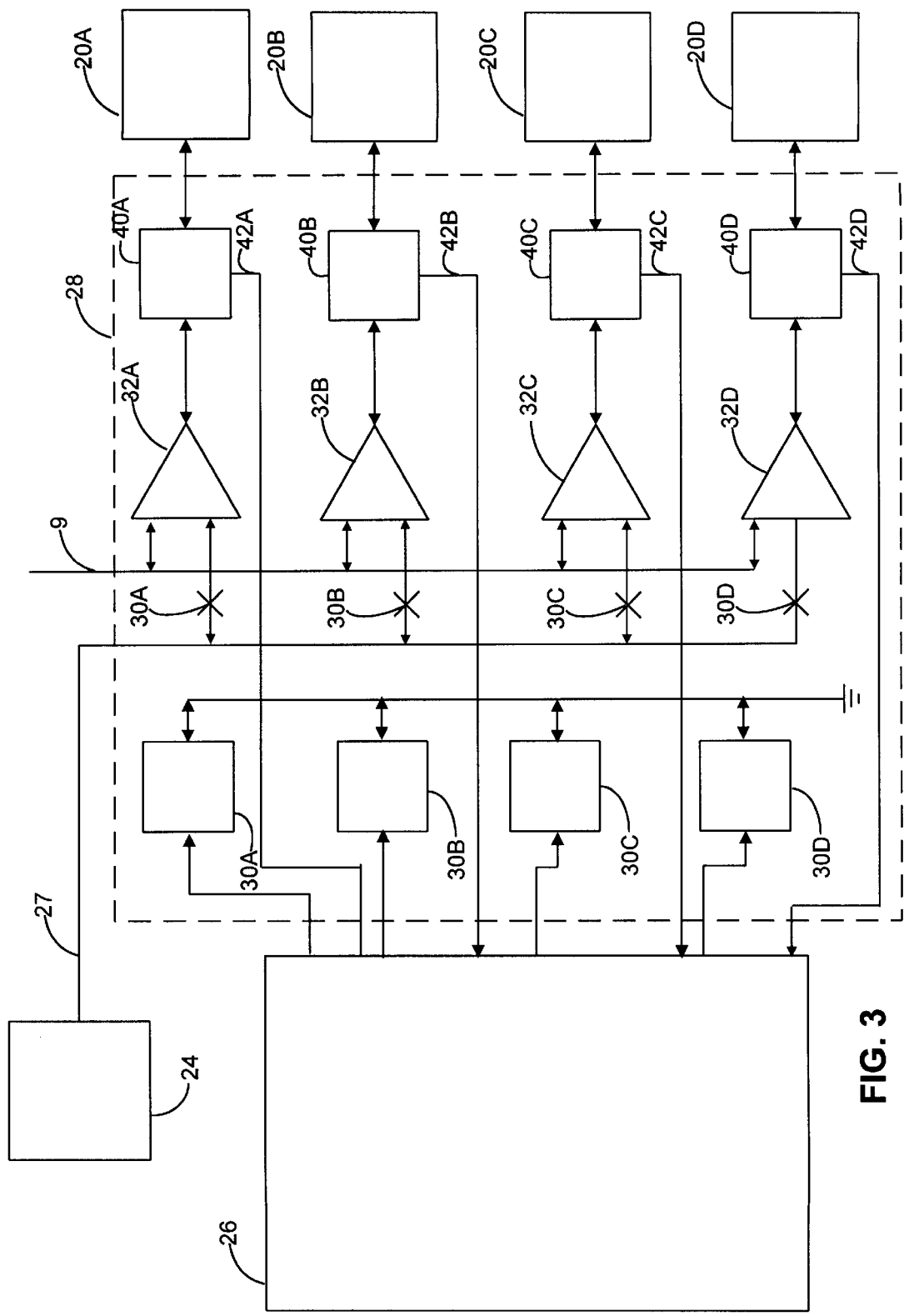
FIG. 3 shows the controller and telephone extension bus components of the control system according to one embodiment of the present invention.

FIG. 3 illustrates the interconnection of the controller 26 and the telephone extension bus 28 for four extensions 20A, 20B, 20C, 20D, in accordance with one embodiment of the invention. As shown in FIG. 3, the telephone extension bus 28 includes relays 30A, 30B, 30C, 30D and corresponding modulators 32A, 32B, 32C, 32D. The controller 26 provides the relays 30A, 30B, 30C, 30D with an input signal in accordance with whether the corresponding extensions 20A, 20B, 20C, 20D are to be rung. For example, if extensions 20A, 20C are to be rung when an incoming call is received, the controller 26 activates relays 30A, 30C, when an indication of an incoming call is received. Activating the relays 30A, 30C permits the ring signal generated by ring generator 24 to pass through the relays 30A, 30C and to modulators 32A, 32C. The modulators 32A, 32C modulate the telephone line 9 with the ring signal generated by the ring generator 24 and provide the telephone line 9 with ring signal to extensions 20A, 20C. Consequently, extensions 20A, 20C are rung to indicate the presence of an incoming call, while extensions 20B, 20D are not rung. It should be noted that all of the extensions 20A, 20B, 20C, 20D are connected to telephone line 9 and, thus, all extensions 20A, 20B, 20C, 20D can be used to answer the incoming call.

Alternatively, for extension wiring schemes utilizing a parallel connection for extensions 20, an interface device (not shown) bearing a unique system address is connected between the extension 20 and the telephone extension bus 28. The interface device removes the ring signal in accordance with whether the interface device has been activated. In this regard, the interface device can be enabled or disabled utilizing in-band multitone signalling generated by the controller 26. The interface device is an off-the-shelf device known to those skilled in the art.

In accordance with another aspect of the invention, the control system 10 rings other extensions 20 when an incoming call is not answered after a predetermined number of rings or time. Ringing one or more extensions initially, and ringing other extensions when the incoming call is not initially answered during a predetermined period of time, is referred to as staged ringing. As shown in FIG. 3, the telephone control bus 28 further includes loop detectors 40A, 40B, 40C, 40D which are connected to extensions 20A, 20B, 20C, 20D, respectively. The loop detectors 40 detect the use of one or more of the extensions 20, i.e. the use of an extension 20 to either answer an incoming telephone or initiate an outgoing call. In this regard, the loop detectors 40A, 40B, 40C, 40D detect when a corresponding extension's 20A, 20B, 20C, 20D hand set is taken off-hook. The loop detectors 40 are off-the-shelf items known to those skilled in the art. Upon detecting the use of an extension 20A, 20B, 20C, 20D, the corresponding loop detector 40A, 40B, 40C, 40D provides the controller 26 an indication that the extension 20 is in-use on lines 42A, 42B, 42C, 42D. In this regard, the controller 26 determines whether an extension 20 has been used to answer an incoming call by monitoring lines 42. For example, in the event extensions 20A, 20C are rung in response to an incoming call, the controller 26 determines whether the incoming call has been answered by monitoring lines 42A, 42B, 42C, 42D for an in-use signal.

In the event an in-use signal is not received after a predetermined number of rings or time, the controller 26 directs other extensions 20 to ring. In this regard, the controller activates other relays 20 to ring extensions 20 not initially rung. Preferably, the controller 26 deactivates relays 30 corresponding to extensions 20 which were initially rung. For example, controller 26 can be directed to ring extensions 20A, 20B when an incoming call is initially received. If an in-use signal is subsequently received on any one of the lines 42A, 42B, 42C, 42D, the incoming call is presumed to be answered. If an in-use signal is not received after a predetermined number of rings or time, the controller 26 can be directed to disable the ringing of extensions 20A, 20B and ring extensions 20B, 20D.

Figure 4:
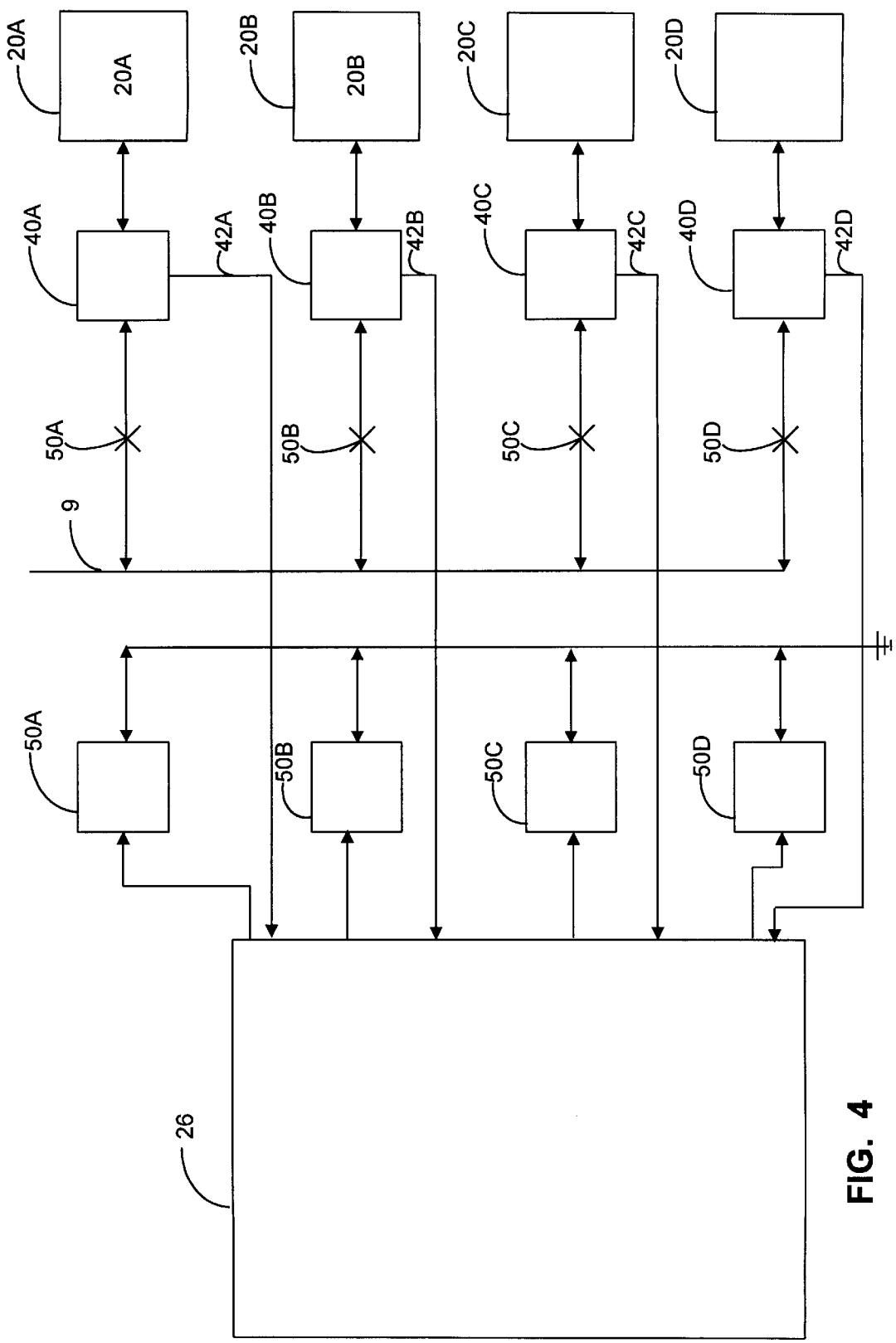
FIG. 4 shows the telephone extension bus component of the control system according to one embodiment of the present invention.

In accordance with another aspect of the invention, the control system 10 selectively disables at least one of the extensions 20 from being used. As shown in FIG. 4, the telephone extension bus 28 includes relays 50A, 50B, 50C, 50D which correspond to extensions 20A, 20B, 20C, 20D. The controller 26 provides relays 50A, 50B, 50C, 50D with an input signal in accordance with whether the corresponding extension 20A, 20B, 20C, 20D is to have access to telephone line 9. For example, the controller 26 can be directed to deactivate relay 50A, which will disable the use of extension 20A to answer incoming calls or initiate outgoing calls.

In accordance with another aspect of the invention, the control system 10 selectively disables at least one of the extensions 20 from being used when another extension 20 is in-use. In this regard, the loop detectors 40 are used to determine whether an extension 20 is in-use. Upon receiving an in-use signal, the controller 26 deactivates relays 50 corresponding to extensions 20 which are not in-use. For example, if extension 20A is used to initiate an outgoing call, loop detector 40A detects such use and provides an in-use signal on line 42A to controller 26. Upon receiving an in-use signal from loop detector 40A, the controller 26 can be directed to disable none, one or more extensions 20B, 20C, 20D from being used by deactivating relays 50B, 50c, 50D. Preferably, upon completing the use of extension 20A, the controller 26 reconnects any extensions 20B, 20C, 20D which were previously disabled. For example, upon receiving an indication from loop detector 40A that extension 20A is no longer in-use, the controller 26 can activate relays 50B, 50C, 50D, thereby reconnecting extensions 20B, 20C, 20D to telephone line 9.

In accordance with another aspect of the invention, the control system 10 controls the use of the extensions 20 when another extension 20 is used for a data call. In this regard, the telephone extension bus 28 includes detecting hardware (not shown) for determining whether a particular extension 20 is engaged in a data call. The detecting hardware uses circuitry, known to those skilled in the art, to detect data patterns and/or carrier patterns which are commonly present during a data call and provide a status (i.e., voice call or data call). For example, the detecting hardware can be designed to ascertain the presence of a data pattern indicating that the handshaking process, which commonly occurs during a data call, and provide an appropriate status.

Upon receiving an in-use signal, the controller 26 determines whether the ongoing call is a data call by monitoring the status provided by the detecting hardware. If the ongoing call is a data call, the controller 26 deactivates none, one or more of the relays 50 corresponding to extensions 20 which are not in-use. Preferably, the controller 26 automatically deactivates all of the relays 50 corresponding to extensions 20 which are not in-use. For example, if extension 20A is used to initiate an outgoing call, loop detector 40A detects such use and provides an in-use signal on line 42A to controller 26. Upon receiving an in-use signal from loop detectors 40A, the controller 26 determines if the ongoing call is a data call by monitoring the status provided by the detecting hardware. If the ongoing call is a data call, the controller 26 automatically disables the extensions 20B, 20C, 20D by deactivating relays 50B, 50C, 50D. Preferably, upon completion of the data call using extension 20A, the extensions 20B, 20C, 20D are activated. For example, upon receiving an indication from loop detector 40A that extension 20A is no longer in-use, the controller 26 can activate relays 50B, 50C, 50D, thereby reconnecting extensions 20B, 20C, 20D to telephone line 9.

In accordance with another aspect of the invention, the control system 10 controls access to telephone line 9 by extensions 20 when another extension 20 is in-use. In this regard, the control system 10 provides a prospective user of an extension 20 an indication that another extension 20 is already in-use. For example, if extension 20A is in-use and extensions 20B, 20C, and 20D have been disabled, the controller 26 can be directed to provide a verbal message, e.g. "Extension 1 is in-use. Try again later.", in response to an attempt to initiate an outgoing call on one of extensions 20B, 20C, 20D.

Alternatively, the control system 10 selectively connects an extension 20 to the telephone line 9 when an ongoing call is occurring at another extension 20. In this regard, if extension 20A is in-use and extensions 20B, 20C, and 20D have been disabled, the controller 26 selectively connects an extension 20B, 20C, 20D to telephone line 9 in response to a user's command to do so. For example, by the use of pass number or some other security measure, a user of extension 20B can bypass the verbal message and connect to the ongoing call occurring at extension 20A.

Alternatively, the control system 10 automatically disconnects an ongoing call and connects an extension 20 to the telephone line 9. In this regard, if extension 20A is in-use and extensions 20B, 20C, and 20D have been disabled, the controller 26 automatically disconnects an ongoing call at extensions 20A and connects extension 20B, 20C, 20D to telephone line 9 in response to a command to do so. For example, if extension 20A is being used for a data call and extensions 20B, 20C, 20D are disabled, the controller 26 can be directed to give extension 20B immediate access to telephone line 9 in response to a certain key sequence indicating an emergency, for example 911. Preferably, the control system 10 automatically dials 911 to gain immediate access to emergency services.

Figure 5:
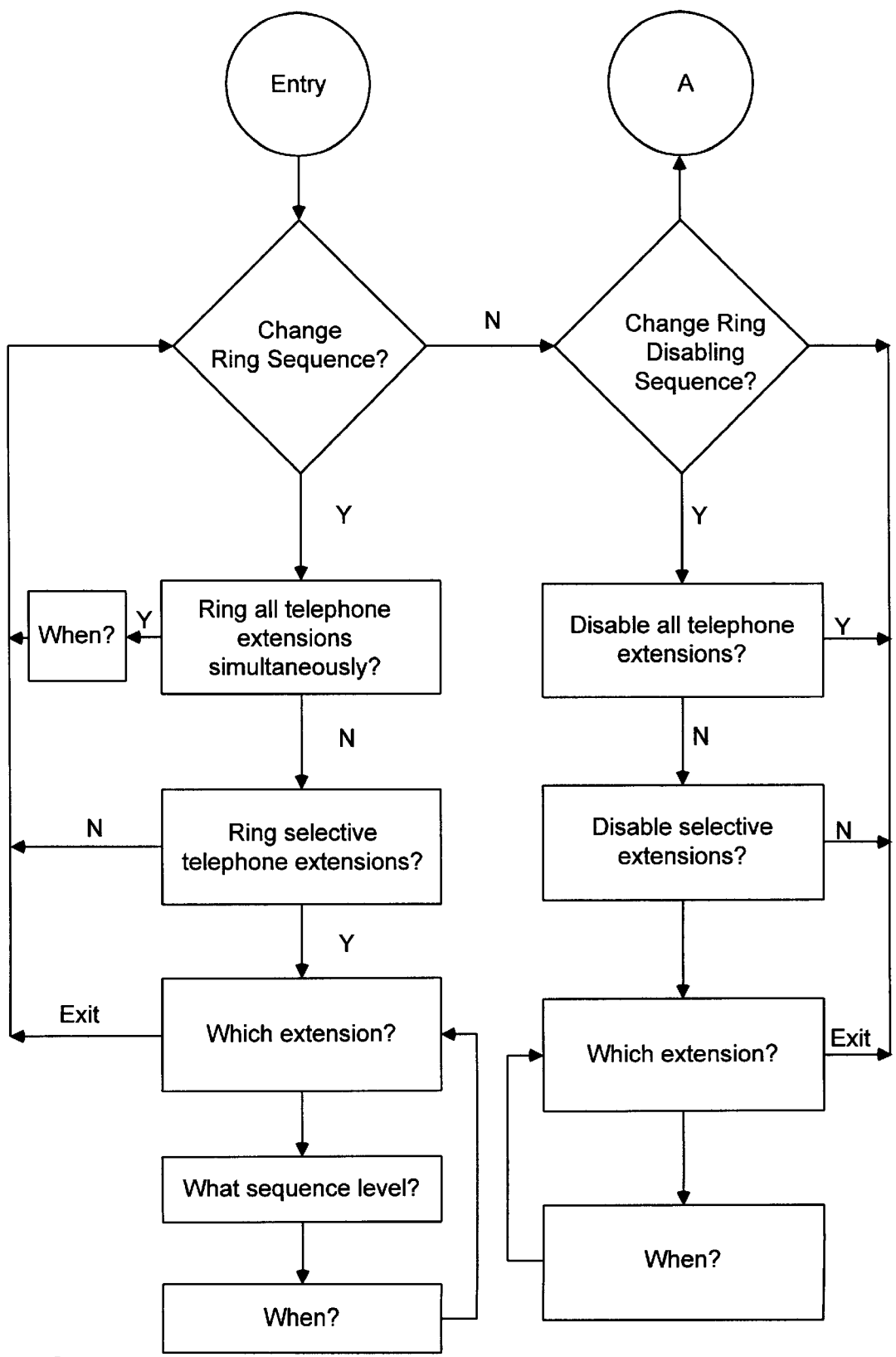
FIG. 5 shows the ring sequence and/or ring disabling sequences for the control system according to one embodiment of the present invention.

In accordance with another aspect of the invention, the control system 10 controls extensions 20 in accordance with preset and/or preprogrammed instructions. Referencing FIG. 5, the ring sequence and/or ring disabling sequence of the control system 10 are operable in accordance with a user's instruction. The control system 10 is capable of being programmed to ring all extensions 20 simultaneously at various times during the day. For example, the control system 10 can be programmed to ring all extensions 20 simultaneously during times, such as the hours 9 am to 3 pm, Monday through Friday, when residential members may be throughout the residence. The control system 10 is capable of being programmed to disable the ring function of selective extensions 20. For example, the control system 10 can be programmed to not ring an extension 20 located in a child's bedroom during the time 7–10 pm, Sunday–Thursday, when the child is typically studying.

The control system 10 is capable of being programmed to selectively ring extensions 20 in staged sequence. For example, the control system 10 can be programmed to ring a family room extension 20 for a predetermine number of rings or time, before ringing an extension 20 located elsewhere in the residence, e.g. the bedroom, basement or garage.

Figure 6:
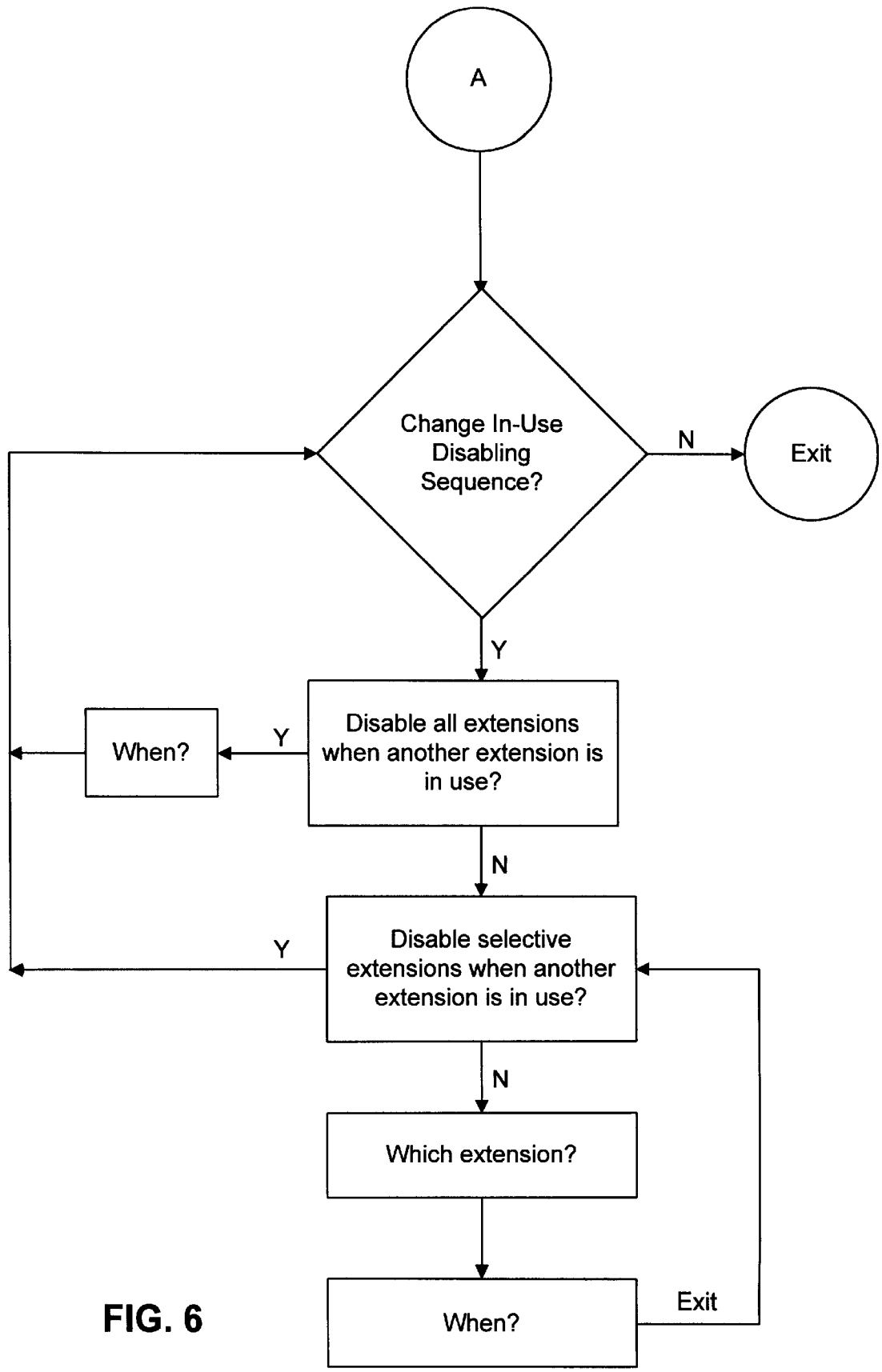
FIG. 6 shows the in-use disabling sequence for the control system according to one embodiment of the present invention.

The controller's 26 disabling of extensions 20 when another extension 20 is in-use is operable in accordance with a user's instruction. Referencing FIG. 6, the control system 10 is capable of being programmed to disable the use of all extensions 20 not in-use, when one of the extensions 20 is in-use. For example, the control system 10 can be programmed to disable the use of extensions 20A, 20B, 20C when extension 20D is in-use. The control system 10 is capable of being programmed to disable the use of none, one, or more of extensions 20 when a selected extension 20 is in-use. For example, the control system 10 can be programmed to provide a secured line by disabling the use of extensions 20B, 20C, 20D when extension 20A, such a master bedroom or study extension, is in-use.

The control system 10 is programmable by ways known to those skilled in the art, including for example, by the use of toggle switches, dual tone multiple frequency band receivers, home computers, infrared remote control devices, screen type telephone devices, or voice recognition receivers. In one embodiment of the present invention, the control system 10 includes toggle switches (not shown) placed on the exterior of the control system 10 and manipulatable to control the operation of the control system 10 in accordance with a user's instruction. Alternatively, the control system 10 includes a dual tone multiple frequency receiver (not shown) to accept tone commands from none, one or more of the extensions 20. In this regard, an extension's 20 key pad is used to access the control system 10 and program a user's instructions. For example, the control system 10 can be accessed by using an extension 20 to obtain a dial tone and then by pressing the # key. Preferably, access to the control system 10 is indicated by a distinctive dial tone. Preferably, a pass key sequence or other security measure is used to control access to the control system 10. Once accessed, the control system 10 is programmable by the use of key sequences, such as 1* for changing the ring sequence; 2* to change the ring disabling sequence; 3* to change in-use disabling sequence and # to exit.

Alternatively, the control system 10 includes interface hardware (not shown) for connection to a computer (not shown). In this regard, software for use on a computer can be provided, which enables a user to program the control system 10. For example, the control system 10 can be accessed by a home computer by connection to any one of the extensions 20. The software can be designed with a menu driven graphical interface to facilitate the programming of the user's instructions. Alternatively, the control system 10 is programmable by a remote control device (not shown), such as those used to control other household devices such as tv's, stereos, vcr's, etc. In this regard, a remote control device is used to access the control system 10. Preferably, relays (not shown) are positioned in a variety of rooms to provide the remote control device the ability to access the control system 10 from those rooms. Once accessed, the key pad on the remote control device is used to program the control system 10 in accordance with a user's instructions. For example, the remote control device's key pad can be used to access the control system 10. Once accessed, number keys on the key pad can be pressed to program the control system 10, e.g. 999 for changing the ring sequence; 888 to change the ring disabling sequence; 777 to change in-use disabling sequence and 000 to exit.

Alternatively, extensions 20 having visual interface devices (not shown) are used to access and program the control system 10. In this regard, an extension 20 having a touch screen (not shown) is used to program the control system 10 in accordance with a user's instruction. For example, the touch screen can be used to provide a visual interface to facilitate the programming of the control system 10 in accordance with a user's instructions. Alternatively, the control system 10 includes voice recognition hardware (not shown) to accept voice commands from any one of the extensions 20. In this regard, an extension 20 is used to access the control system 10 and the extension's 20 hand set is used to verbally indicate to the control system 10 a user's instruction. For example, an extension 20 can be used to obtain a dial tone and then the # key can be pressed to gain access to the control system 10. Once accessed, voice commands can be used to program the control system 10 in accordance with a user's instruction, including for example, "change ring sequence" to change the ring sequence; "change ring disabling sequence" to change the ring disabling sequence; "change in-use disabling sequence" to change in-use disabling sequence and "exit" to exit. By way of further example, a user can say "disable ringing on telephone two" to disable the ring function of an extension 20 located in a child's bedroom.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

What is claimed is:

1. A control system, which interfaces a central office telephone line with a plurality of telephones, the plurality of telephones capable of being used to answer incoming calls and initiate outgoing calls, said control system comprising;

first means for controlling the ring function of at least one of said plurality of telephones when an incoming call is received;

second means for controlling the staging of the ring function of said plurality of telephones when an incoming call is received; and third means for controlling the use of one or more of said plurality of telephones to initiate an outgoing call by selectively disabling at least one of said plurality of telephones from being used to initiate an outgoing call when another of said plurality of telephones is in use.

2. A control system as claimed in claim 1, wherein said first means comprises means for selectively ringing at least one of said plurality of telephones when an incoming call is received.

3. A control system as claimed in claim 1, wherein said first means comprises means for selectively disabling the ring function of at least one of said plurality of telephones from ringing when an incoming call is received.

4. A control system as claimed in claim 1, wherein said second means comprises means for selectively ringing at least one of said plurality of telephones only after another of said telephones has rung a predetermined number of rings in response to an incoming call.

5. A control system as claimed in claim 1, wherein said second means comprises means for selectively ringing at least one of said plurality of telephones only after another of said telephones has rung a predetermined time in response to an incoming call.

6. A control system as claimed in claim 1, wherein said third means comprises means for selectively disabling at least one of said plurality of telephones from being used to initiate an outgoing call.

7. A control system as claimed in claim 1, wherein said third means disables all of said plurality of telephones from being used to initiate an outgoing call when another of said plurality of telephones is in-use.

8. A control system as claimed in claim 1, wherein said third means comprises means for selectively disabling at least one of said plurality of telephones from being used to initiate an outgoing call when another of said plurality of telephones is being used for a data call.

9. A control system as claimed in claim 8, wherein said third means disables all of said plurality of telephones from being used to initiate an outgoing call when another of said plurality of telephones is being used for a data call.

10. A control system as claimed in claim 8, wherein said third means comprises detecting means for automatically indicating whether said central office telephone line is being used for a data call.

11. A control system as claimed in claim 10, wherein said third means disables all of said plurality of telephones not in-use from being used to initiate an outgoing call when said detecting means indicates that said central office telephone line is being used for a data call.

12. A control system as claimed in claim 1 further comprising:

fourth means for controlling access to the central office telephone line by one or more of said plurality of telephones when another extension is in-use.

13. A control system as claimed in claim 12, wherein said fourth means comprises means for allowing one or more of said plurality of extensions to connect to an ongoing call occurring at another extension.

14. A control system as claimed in claim 12, wherein said fourth means comprises means for selectively cutting-off an ongoing call occurring at another extension.

15. A control system as claimed in claim 1 further comprising:

fifth means for accepting user defined instructions.

16. A control system as claimed in claim 15, wherein said fifth means comprises at least one of the following:

a toggle switch;

dual tone multiple frequency band receiver;

a microprocessor; or a voice recognition device.

17. A control system as claimed in claim 15, wherein said fifth means comprises means for accepting user defined instructions from at least one of the following:

a computer;

a screen type telephone device; or a infrared remote control device.

18. A control system as claimed in claim 1 further comprising:

means for allowing one or more of said plurality of extensions to connect to an ongoing call occurring at another extension; and means for selectively cutting-off an ongoing call occurring at another extension.

19. A control system, which interfaces a central office telephone line with a plurality of telephones located throughout a residence, the plurality of telephones capable of being used to answer incoming calls and initiate outgoing calls, said control system comprising:

means for selectively ringing at least one of said plurality of telephones when an incoming call is received;

means for selectively disabling the ring function of at least one of said plurality of telephones from ringing when an incoming call is received;

means for selectively ringing at least one of said plurality of telephones only after another of said telephones has rung a predetermined number of rings in response to an incoming call;

means for selectively disabling at least one of said plurality of telephones from being used to initiate an outgoing call; and means for selectively disabling at least one of said plurality of telephones from being used to initiate an outgoing call when another of said plurality of telephones is in-use.

* * * * *